United States Patent
Bonneville et al.

(10) Patent No.: US 7,366,095 B2
(45) Date of Patent: Apr. 29, 2008

(54) METHOD FOR CONTROLLING ACCESS TO A SHARED WIRELESS MEDIUM OR SEVERAL CONNECTIONS

(75) Inventors: Hervé Bonneville, Acigne (FR); Nathalie Omnes, St-Sulpice la Foret (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 590 days.

(21) Appl. No.: 10/984,991

(22) Filed: Nov. 10, 2004

(65) Prior Publication Data

US 2005/0122901 A1    Jun. 9, 2005

(30) Foreign Application Priority Data

Nov. 10, 2003    (EP)    ................... 03292804

(51) Int. Cl.
*H04J 1/16* (2006.01)
*H04J 3/16* (2006.01)
*H04L 12/28* (2006.01)

(52) U.S. Cl. ...................... 370/230; 370/252; 370/389; 370/465

(58) Field of Classification Search .................. None
See application file for complete search history.

(56) References Cited

U.S. PATENT DOCUMENTS 5,487,072 A    1/1996   Kant
6,049,549 A *  4/2000   Ganz et al. ................. 370/449
6,778,522 B1 * 8/2004   Rossi et al. ................. 370/349

(Continued)

FOREIGN PATENT DOCUMENTS

EP    0 913 968 A1    5/1999

(Continued)

OTHER PUBLICATIONS

Daqing Gu, et al. "A New Measurement-Based Admission Control Method for IEEE802.11 Wireless Local Area Networks"; MERL-A Mitsubishi Electric Research Laboratory; Oct. 2003; pp. 1-7; XP002283095; URL:http://www.merl.com/reports/docs/TR2003-122.pdf; retrieved on Jun. 2, 2004.

(Continued)

*Primary Examiner*—Huy D. Vu
*Assistant Examiner*—Nittaya Juntima
(74) *Attorney, Agent, or Firm*—Oblon, Spivak, McClelland, Maier & Neustadt, P.C.

(57) ABSTRACT

The invention concerns a method for admission control of connections made up of one or several flows to a shared wireless medium. It applies criteria for each new connection to determine whether resources can be provided for this connection. The criteria include the steps of: calculating a number (R) of retransmissions of frames which are needed, depending on: a target application PDU error rate ($\epsilon_i$); a data link layer mean error rate (BER); and a maximum size (L) of the transmitted frames; calculating the achievable quality of service parameters ($T'_i$) based on the calculated number (R) of retransmissions with the target application PDU error rate ($\epsilon_i$), and determining if resources can be provided for the connection depending on the achievable quality of service parameter ($T'_i$).

14 Claims, 5 Drawing Sheets

U.S. PATENT DOCUMENTS

| | | |
|---|---|---|
| 7,190,684 B2 * | 3/2007 | Cao et al. .................. 370/335 |
| 7,212,507 B2 * | 5/2007 | Wang et al. ................ 370/329 |
| 2002/0041566 A1 | 4/2002 | Yang et al. |
| 2003/0126536 A1 | 7/2003 | Gollamudi et al. |
| 2005/0147041 A1 * | 7/2005 | Zaki et al. .................. 370/235 |

FOREIGN PATENT DOCUMENTS

| | | |
|---|---|---|
| EP | 1 063 864 A1 | 12/2000 |
| WO | WO 00/11806 | 3/2000 |

OTHER PUBLICATIONS

Patent Abstracts of Japan, JP 2000324321, Nov. 24, 2000.

"Dynamic Resource Control for Shared Downlink Wireless Channel"; Mitsubishi Electric Research Laboratories; Aug. 28, 2003; p. 1; XP002283096; URL:http://www.merl.com/projects/dynamic-rresource-control/; retrieved on Jun. 3, 2004.

Romain Rollet, et al. "Field Trial Results at DLC Layer of a HiperLAN/2 Prototype";URL:http://mitsubishi-electric-itce.fr/English/scripts/Publications%20pdf/2003/rollet_vtc03spring.pdf; retrieved on Jun. 2, 2004; 5 pages.

* cited by examiner

METHOD FOR CONTROLLING ACCESS TO A SHARED WIRELESS MEDIUM OR SEVERAL CONNECTIONS

BACKGROUND OF THE INVENTION

The present invention concerns an admission control method of connections made up of one or several flows to a shared wireless medium, each connection requiring a predetermined target application Protocol Data Unit error rate and at least an additional quality of service requirement, the transmission on the shared wireless medium being adapted for transmitting frames of a predetermined maximum size, with a data link layer mean error rate, the method applying a criteria for each new connection to determine whether resources can be provided for this connection. We assume an ARQ (Automatic Repeat reQuest) algorithm to be implemented at the data link layer level.

Such a method is used for Admission Control of connections with Quality of Service requirements.

By connection we mean the route, established between two different network devices, dedicated to the transmission of one or several data flows. When a connection transports several flows, each data link layer Protocol Data Unit (PDU) may include data issued from different flows.

To reach the Quality of Service requirements, the admission control method accepts to establish a new connection only if the load associated with this new connection is lower than the remaining admissible capacity on each shared link. Given C is the total capacity of a link and $\rho$ is its admissible load, the admissible capacity of this link is $\rho \times C$. Assume there are k connections that are already established on the link, and connection i uses a bandwidth equal to $D'_i$, then the remaining admissible capacity equals $$\rho \times C - \sum_{i=1}^{k} D'_i.$$

Each connection may have 0, 1 or several quality of service requirements which are necessary for satisfying each user after reception of his flow.

For example, if an application generates a flow with a minimum throughput requirement, the data link layer shall provide a bandwidth at least equal to this throughput.

In addition, some frames can be erroneous. These frames have to be retransmitted by the ARQ algorithm in order to reach a target application PDU error rate.

In the known Admission Control Methods, no means is provided in order to be sure that the shared link capacity is sufficient to enable all the retransmissions necessary for each connection sharing the link to reach its target application PDU error rate.

SUMMARY OF THE INVENTION

The aim of the invention is to provide a method for improving the management of the resources available on a link.

Accordingly, the subject of the invention is a method for admission control of connections on a shared wireless medium, characterized in that said criteria includes the steps:
calculating a number of retransmissions of frames which are needed in order to reach the target application error rate and the or each quality of service requirement, the number of retransmissions depending on:
the target application error rate;
the data link layer mean error rate; and
the maximum size of the transmitted frames;
calculating the achievable quality of service parameters based on the calculated number of retransmissions with the target application error rate, and
determining if resources can be provided for the connection depending on the or each achievable quality of service parameter.

According to particular embodiments, the method comprises the features of one or more sub-claims.

DESCRIPTION OF THE DRAWINGS

The invention will be better understood on reading the description which follows, given merely by way of example and while referring to the drawings in which.

DETAILED DESCRIPTION

Figure 1:
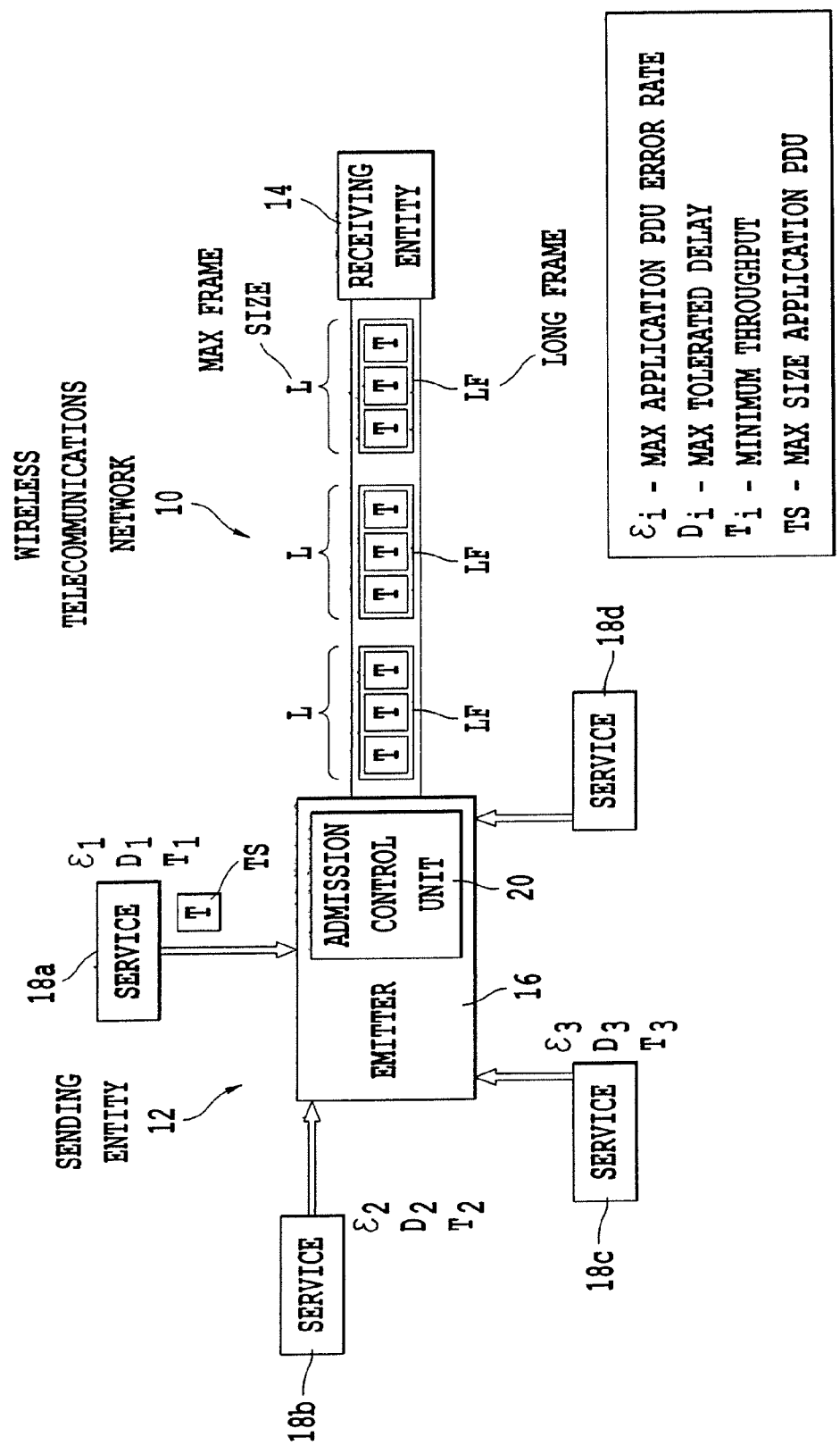
FIG. 1 illustrates a network which aggregates several application PDU into a long frame.

FIG. 1 shows a wireless telecommunication network 10 comprising a sending entity 12 adapted to communicate over an air interface with a receiving entity 14. This network can for example be an IEEE 802.11 WLAN.

The sending entity 12 comprises an emitter 16 which is adapted for sending long frames (LF) of maximum size L bytes to the receiving entity 14. The data link layer is assumed to have a mean bit error rate (BER).

The sending entity 12 includes several types of services 18a, 18b, 18c and 18d linked to the emitter 16. Each type of service may provide one or several flows to the emitter 16 in order to be sent to the receiving entity 14. The type of service 18d is dedicated to best-effort services. In this case, no guarantee is provided to the users, and the present invention does not apply.

Each flow which type of service is either 18a, 18b or 18c has to be received by the receiving entity 14 with a maximum application PDU error rate $\epsilon_i$ in order to satisfy the user.

In order to reach the maximum application PDU error rate $\epsilon_i$, the data link layer is adapted for re-transmitting the erroneous frames, when they are detected by the receiving entity. When an erroneous frame is received, the full frame is retransmitted according to the data link layer protocol.

In addition, one or several quality of service requirements has to be reached for each connection.

For example, for a voice service, the end-to-end transmission delay has to be lower than a maximum tolerated delay $D_i$.

For a videoconference service, the bandwidth allocated to the connection has to guarantee a minimum throughput $T_i$ at the application level.

Depending on the services, throughput or delay requirements may have to be reached in addition to the target application PDU error rate $\epsilon_i$.

The quality of service requirements $D_i$, $T_i$ and the target application PDU error rate $\epsilon_i$ have to be satisfied at the output of the receiving entity.

To ensure that the maximum application PDU error rate $\epsilon_i$ and a quality of service requirement $D_i$ and/or $T_i$ are reached, the emitter 16 comprises an admission control unit 20 which is in charge of implementing an admission control method as disclosed below.

It is assumed that an application outputs PDU TS of maximum size T bytes.

In case of long frames, the application PDUs are aggregated by the emitter 16 in order to make new frames LF of maximum size L bytes as shown on FIG. 1. The maximum size L of each new aggregated frame LF is higher than the maximum size T of each output application PDU TS plus all intermediate layers headers.

Figure 2:
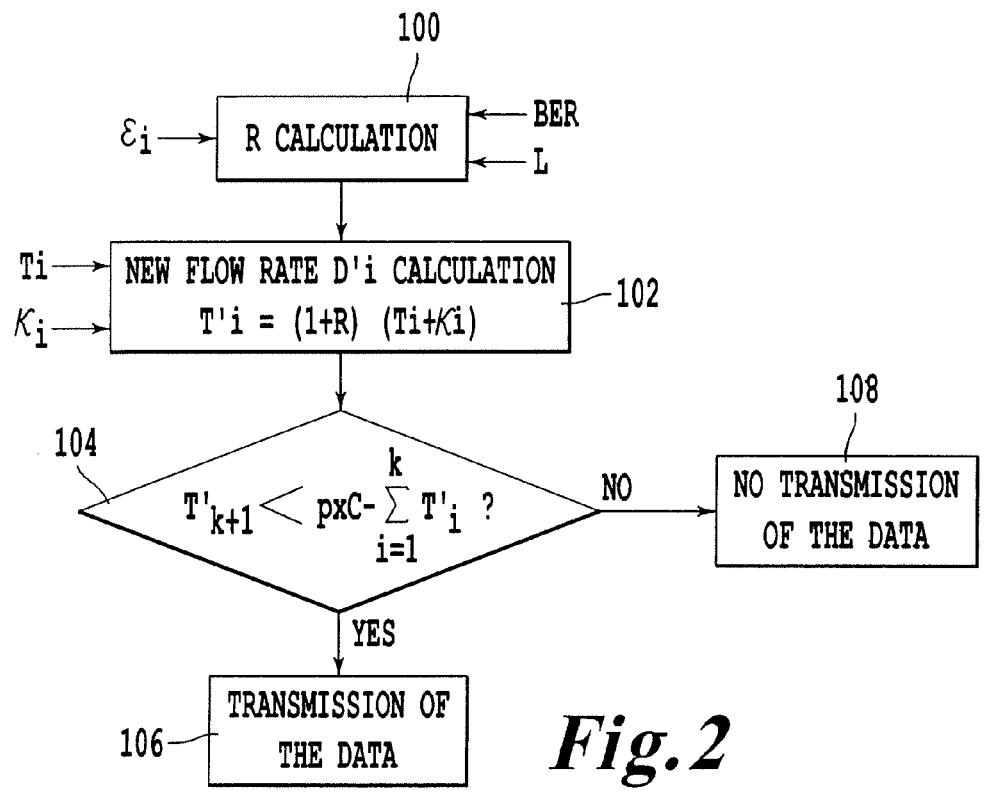
FIG. 2 is a flowchart of an admission control method according to a first implementation of the invention.

A first implementation of the admission control method is disclosed on FIG. 2. The method enables a minimum throughput $T_i$ to be reached together with a maximum transmission application PDU error rate $\epsilon_i$.

At first stage 100, the number R of retransmissions needed for reaching the target application PDU error rate $\epsilon_i$ is calculated as follows:

$$R = \left\lceil \frac{\ln(\varepsilon_i)}{\ln(1-(1-\varphi(BER))^{8L})} - 1 \right\rceil,$$

where $\phi$ is a function. It can for example be $\phi(x)=x$, $\forall x$ or $\phi(x)=\alpha x$, $\forall x$, with $\alpha \in R$.

Let $\kappa_i$ be the traffic induced while crossing intermediate layers.

At step 102, the bandwidth $T'_i$ to reserve at the data link layer level in order to reach the quality of service requirement(s) is determined based on the application throughput $T_i$, the number of retransmissions R and the parameter $\kappa_i$.

The bandwidth $T'_i$ is defined as:

$$T'_i = (1+R) \times (T_i + \kappa_i).$$

In case application PDU are emitted according to a periodic profile ($P_i$ seconds between two consecutive application PDUs), and $H_i$ represent the size of intermediate layers headers in bits, $\kappa_i$ can be computed as $$\kappa_i = \frac{H_i}{P_i}.$$

At step 104, it is checked whether the remaining link capacity is sufficient to allocate bandwidth $T'_{k+1}$ to the new connection. For example, if C is the capacity of the link from the emitter 16 to the receiver 14 and $\rho$ is the admissible load on this link, it is determined, at step 104, enough admissible capacity left to reserve bandwidth $T'_{k+1}$ to the new connection. Assuming that each connection i needs a bandwidth $T'_i$, the remaining admissible capacity equals $$\rho \times C - \sum_{i=1}^{k} T'_i.$$

Thus it is checked if $$T'_{k+1} < \rho \times C - \sum_{i=1}^{k} T'_i.$$

If the capacity is sufficient, the new connection is established at step 106, otherwise the connection is refused at step 108.

Figure 3:
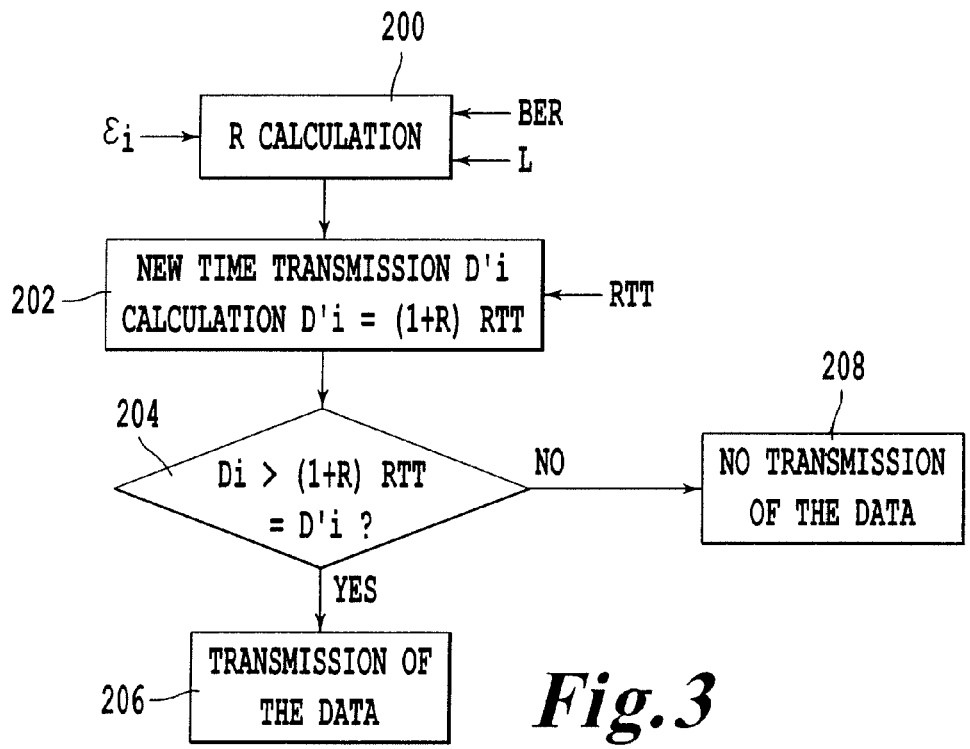
FIG. 3 is a flowchart of an admission control method according to a second implementation of the invention.

FIG. 3 shows the algorithm of the method enabling an end-to-end transmission delay requirement $D_i$ to be reached together with a maximum transmission application PDU error rate $\epsilon_i$.

As previously disclosed, the number R of needed retransmissions is calculated at step 200 as a function of $\epsilon_i$, BER and L.

At step 202, the transmission duration induced by the retransmission is estimated as: $D'_i = (R+1) \times RTT$ where RTT is the Round Trip Time, that is to say the end to end time transmission delay from emitter to receiver and for the reverse path, including processing and waiting times, for each LF frame.

The admission control method determines at step 204 if the new calculated end-to-end transmission delay $D'_i$ is lower than the required maximum end-to-end transmission delay $D_i$. If $D'_i < D_i$, the connection is established at step 206, otherwise, the connection is refused at step 208.

Two different quality of service requirements are disclosed in the algorithms of FIGS. 2 and 3, each requirement being reached separately. In fact, both requirements may be needed and in this case the admission control method allows a connection to be established only if both requirements are met.

Figure 4:
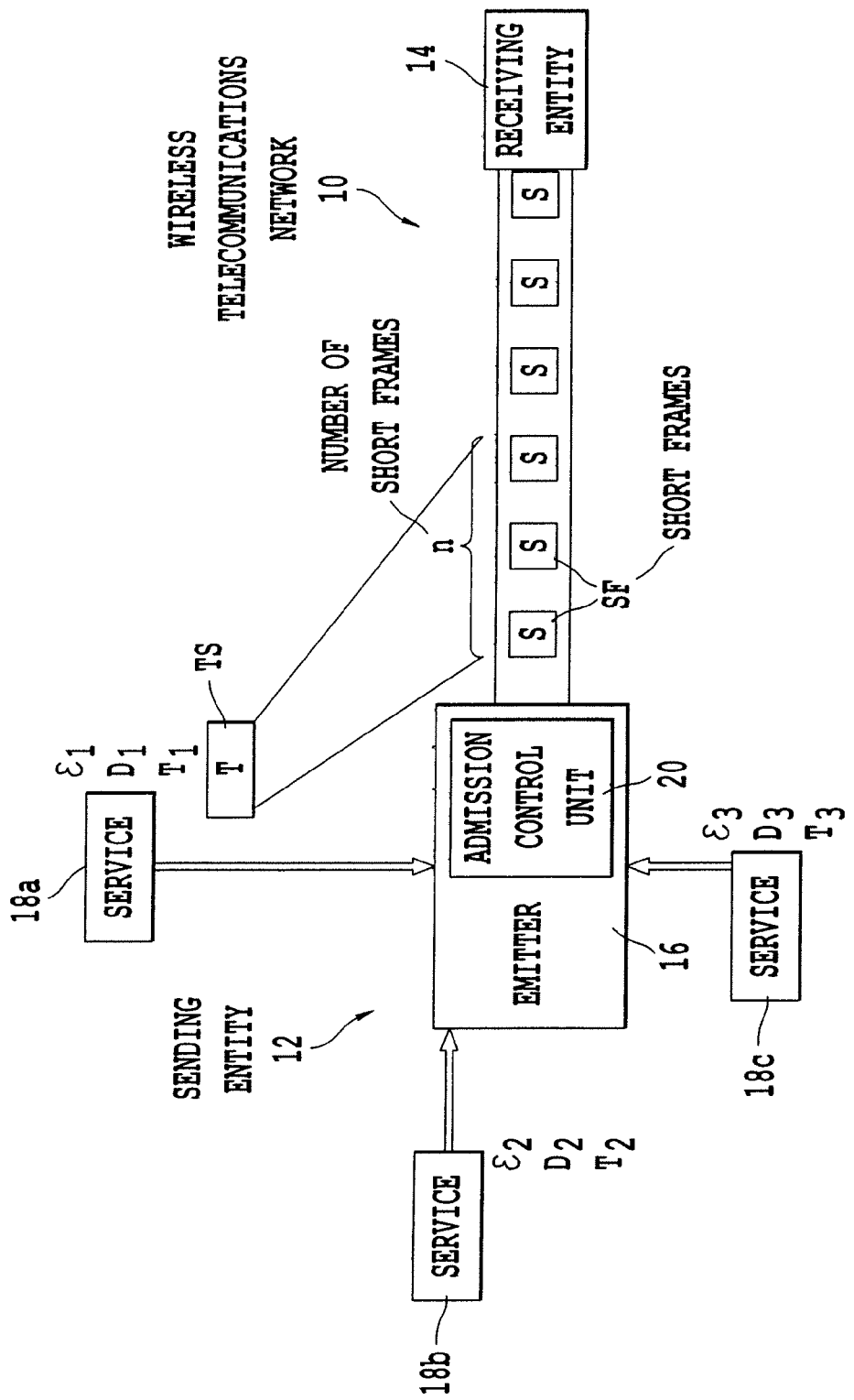
FIG. 4 illustrates a network which segments each application PDU into several short frames.

FIG. 4 shows another wireless telecommunication network which segments application PDU. It can be for example an HiperLAN2 WLAN.

On FIG. 4, the same reference numerals refer to the same units as on FIG. 1.

In case of segmentation, the data link layer PDU are short frames denoted by SF. Their maximum size in bytes is denoted by S and is lower than the maximum size T of the application PDU denoted TS. Consequently, each application PDU TS plus intermediate layers headers are segmented by the emitter 16 in n short frames SF.

In case of segmentation, the number R of retransmissions is shared out between the n short frames SF that make up the TS application PDU.

Define $\alpha(n, R)$ by $$\alpha(n, R) = \sum_{i=1}^{\inf(n,R)} C_n^i C_{R-1}^{i-1},$$

$\forall n, R \geq 1$, and LER by $LER = 1 - (1-\phi(BER))^{8 \cdot S}$, where $\phi$ is a function. It can for example by $\phi(x)=x$, $\forall x$ or $\phi(x)=\alpha x$, $\forall x$, with $\alpha \in R$.

Let $E_r$ be the event "the application PDU TS is erroneous after r SF retransmissions".

The probability $IP(E_r)$ is computed by induction as follows:

$$IP(E_r) = \begin{cases} 1-(1-LER)^n & \text{if } r=0 \\ IP(E_{r-1}) - \alpha(n,r) LER^r \times IP(E_0) & \forall r \geq 1. \end{cases}$$

To compute the number of retransmissions needed to reach an application PDU error rate target value, $IP(E_r)$ is computed by induction until $R = \inf \{r \in N : IP(E_r) \leq \epsilon_i\}$ is reached, where $\inf\{\}$ is a lower bound of a set of numbers and N is the set of natural numbers. The number of retransmitted SF is given by R, whereas the total number of transmitted SF equals R+n.

Figure 5:
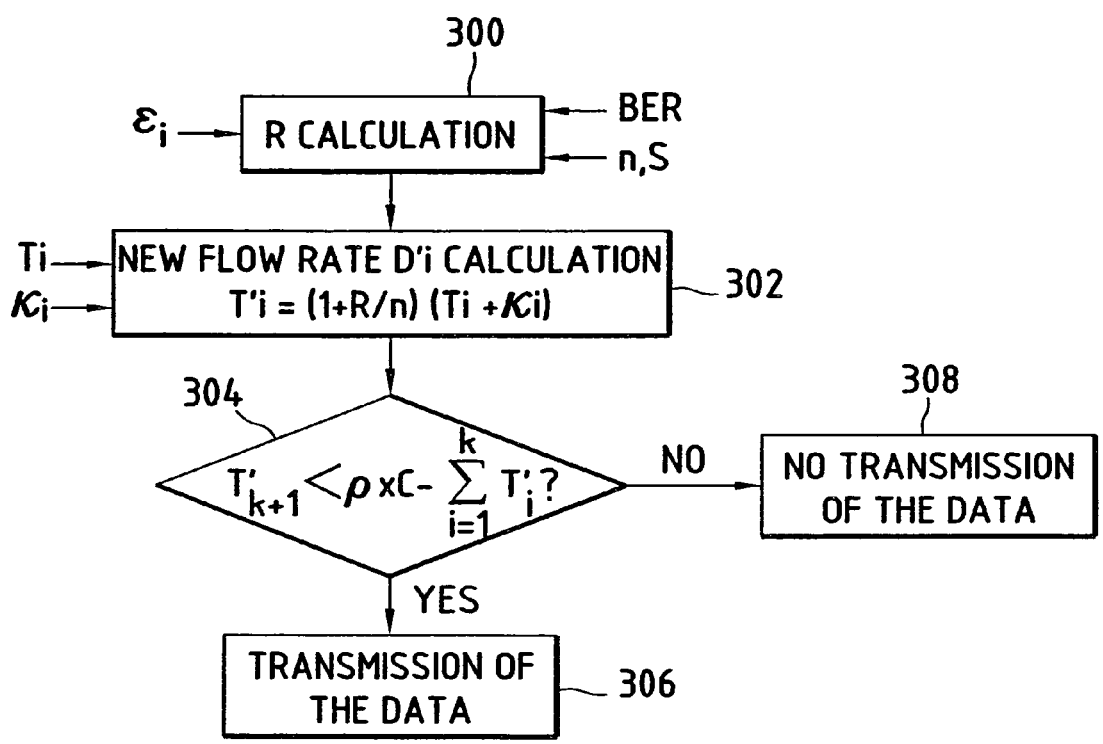
FIG. 5 is a flowchart of an admission control method according to a third implementation of the invention.

An implementation of the admission control is disclosed in FIG. 5. The method enables a maximum throughput $T_i$ to be reached together with a maximum transmission application PDU error rate $\epsilon_i$.

At step 300, the number R of retransmissions needed is calculated as explained above as a function of $\epsilon_i$, BER, n and S.

In order to reach the required throughput $T_i$, the bandwidth to reserve $T'_i$ is calculated in that case at step 302 as $$T'_i = \left(1 + \frac{R}{n}\right) \times (T_i + \kappa_i),$$

where $\kappa_i$ is the traffic induced while crossing intermediate layers. In case application PDU are emitted according to a periodic profile ($P_i$ seconds between two consecutive application PDUs), and $H_i$ represent the size of intermediate layers headers in bits, this parameter can be computed as $$\kappa_i = \frac{H_i}{P_i}.$$

A checking step 304 and a connexion step 306 or a connexion refusal step 308 corresponding to steps 104, 106 and 108 of FIG. 2 are then implemented.

A rough upper bound of delay may be calculated as in the previous case described in FIG. 3 where $D'_i$ is computed as $D'_i = (1+R) \, RTT$.

Figure 6:
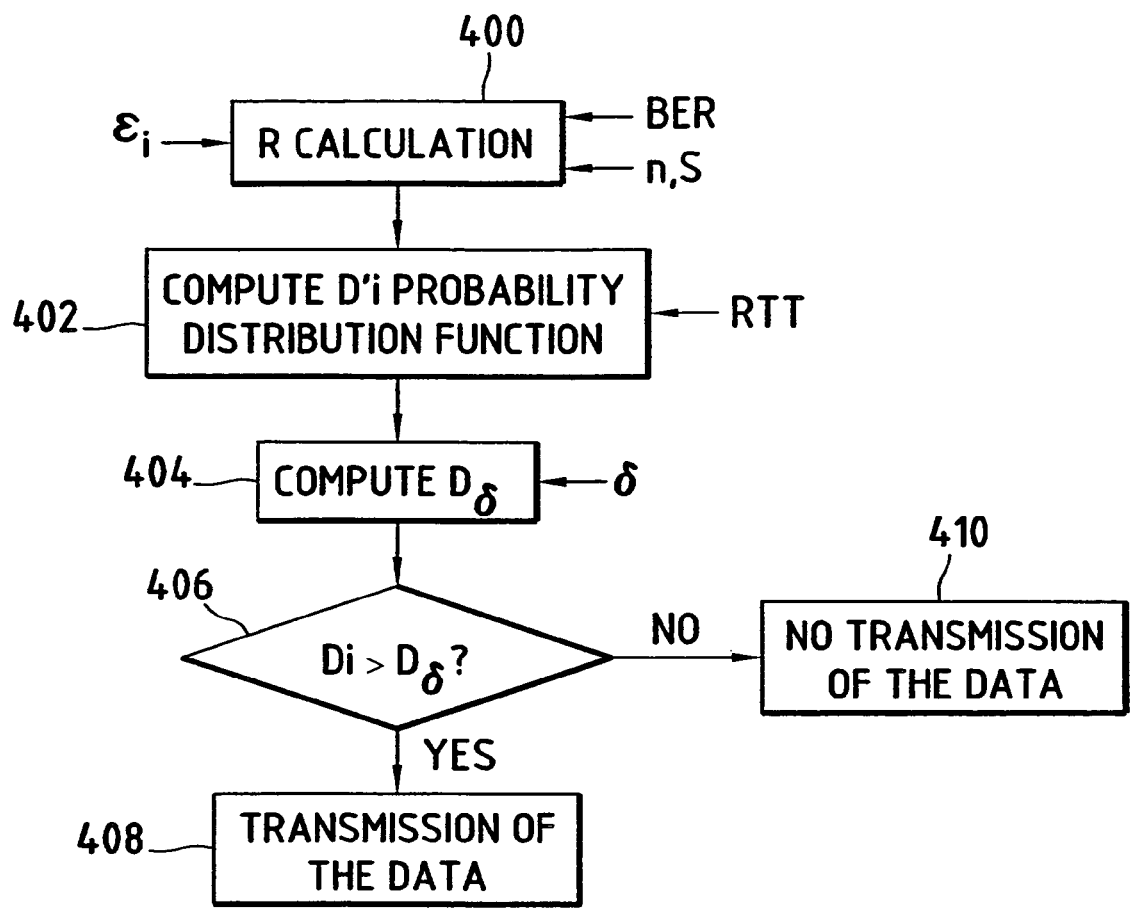
FIG. 6 is a flowchart of an admission control method according to a fourth implementation of the invention.

FIG. 6 shows an alternative algorithm of the method enabling an end-to-end transmission delay requirement $D_i$ to be reached together with a maximum transmission application PDU error rate $\epsilon_i$. In that case, $D'_i$ is computed more accurately by using probability theory.

A stage 400, the number R of needed retransmissions is calculated as a function of $\epsilon_i$, BER, n and S.

At stage 402, $D'_i$ is calculated as a probability distribution function.

In this case, we have:

$$IP(D'_i \leq d) = \sum_{i=0}^{\inf(n,R)} \sum_{k=i}^{R} \sum_{r_1+\ldots+r_i=k} 1\!\!1_{[\max[r_1,\ldots,r_i] \times RTT, +\infty[}(d) \times C_n^i LER^k (1-LER)^n$$

where $1\!\!1_A(x)$ is a characteristic function of a set and $1\!\!1_A(x) = 1$ if and only if x lies in the subset A.

At step 404, a maximum delay $D_\delta$ is calculated according to an allowed margin of error denoted $\delta$.

$D_\delta$ is chosen such that $$IP(D'_i \geq D_\delta) \leq \delta.$$

At step 406, a test is carried out so that the new connection is accepted at step 408 provided its required delay $D_i$ is lower than or equal to $D_\delta$. Otherwise, the connection is refused at step 410.

According to a particular embodiment, a computer program product is provided for the admission control unit, including a set of instructions which, when loaded into the admission control unit, causes the admission control unit to carry out the method as described above.

The invention claimed is:

1. A method for admission control of connections made up of one or several flows to a shared wireless medium, each connection requiring a predetermined target application Protocol Data Unit (PDU) error rate ($\epsilon_i$) and at least an additional quality of service requirement ($D_i$; $T_i$), a transmission on the shared wireless medium being adapted for transmitting frames (LF; SF) of a predetermined maximum size (L; S), with a data link layer mean error rate (BER), the method comprising:

applying criteria for new connections to determine whether resources can be provided for a respective connection, said criteria include the steps:

calculating a number (R) of retransmissions of frames (LF; SF) which are needed in order to reach the target application PDU error rate ($\epsilon_i$) and the quality of service requirement ($D_i$; $T_i$), the number (R) of retransmissions depending on:

the target application PDU error rate ($\epsilon_i$);

a data link layer mean error rate (BER); and the maximum size (L; S) of the transmitted frames (LF; SF);

calculating an achievable quality of service parameter ($D'_i$; $T'_i$) based on the calculated number (R) of retransmissions with the target application PDU error rate ($\epsilon_i$), and determining if resources can be provided for the connection depending on the achievable quality of service parameter ($D'_i$; $T'_i$).

2. The method according to claim 1, wherein the quality of service requirement is a maximum end-to-end transmission delay ($D_i$) required by a connection.

3. The method according to claim 1, wherein the quality of service requirement is a minimum throughput ($T_i$) required by a connection.

4. The method according to claim 1, wherein several application PDUs are aggregated into long frames (LF), the maximum size (L) of respective long frames (LF) transmitted over the shared wireless medium being higher than a maximum size (T) of an application PDU plus intermediate layer headers and in that the number (R) of needed retransmissions is:

$$R = \left\lceil \frac{\ln(\epsilon_i)}{\ln(1-(1-\varphi(BER))^{8L})} - 1 \right\rceil$$

where:

BER is the mean bit error rate on the data link layer;

L is the maximum size of transmitted data link layer PDU (LF) in bytes;

$\epsilon_i$ is the target application PDU error rate;
φ is a function; and
ln is a natural log.

5. The method according to any one of claims 2 and 4, wherein an achievable maximum end-to-end transmission delay $D'_i$ is: $D'_i=(1+R)RTT$, where RTT is the round trip time for each long frame (LF).

6. The method according to any one of claims 3 and 4, wherein a bandwidth to reserve $T'_i$ is $T'_i=(1+R)\times(T_i+\kappa_i)$, where $T_i$ is an application throughput and $\kappa_i$ is an additional bandwidth induced by intermediate layers.

7. The method according to any one of claims 1-3, wherein application PDUs are segmented into several short frames (SF), a maximum size (S) of short frames (SF) transmitted over the shared wireless medium being lower than a maximum size (T) of an application PDU (TS) plus intermediate layer headers leading to a respective application PDU (TS) to be segmented in n short frames (SF) and in that the number (R) of needed retransmissions is calculated by induction until the target application PDU error rate ($\epsilon_i$) is reached.

8. The method according to claim 7, wherein the number R of needed retransmissions is defined by computing by induction on r the probability $IP(E_r)$ of the event "the transmitted application PDU TS is erroneous after r SF retransmissions" until R is reached as follows,
R=inf $\{r\in N: IP(E_r) \leq \epsilon_i\}$,
where:
inf{ }is a lower bound of a set of numbers, and
N is the set of natural numbers.

9. The method according to claim 8, wherein: $LER=1-(1-\phi(BER))^{8S}$, where BER is the mean bit error rate on the data link layer, φ is a function, LER is a link error rate, and $$IP(E_r) = \begin{cases} 1-(1-LER)^n & \text{if } r=0 \\ IP(E_{r-1}) - \alpha(n,r)LER^r \times IP(E_0) & \forall r \geq 1. \end{cases}$$

10. The method according to any one of claims 1 and 3, wherein a bandwidth to reserve $T'_1$ is $$T'_i \text{ is } T'_i = \left(1 + \frac{R}{n}\right) \times (T_i + \kappa_i),$$

where $T_1$ is an application throughput and $\kappa_i$ is an additional bandwidth induced by intermediate layers.

11. The method according to claims 1 or 2, wherein an achievable maximum end-to-end transmission delay $D'_i$ is: $D'_i=(1+R)$ RTT, where RTT is the round trip time for each short frame (SF).

12. The method according to claims 1 or 2, wherein a probability distribution function of an achievable end-to-end transmission delay ($D'_i$) is:

$$IP(D'_i \leq d) = \sum_{i=0}^{\inf(n,R)} \sum_{k=i}^{R} \sum_{r_1+\ldots+r_i=k} 1I_{[\max\{r_1,\ldots,r_i\}\times RTT,+\infty[}(d) \times C_n^i LER^k (1-LER)^n,$$

where R is previously fixed, C is a capacity of a link, n, k, and d are integer values, RTT is a round trip time of a frame, and $1I_A(x)$ is a characteristic function of a set where $1I_A(x)=1$ if and only if $x\in A$.

13. The method according to claim 12, wherein an allowed margin of error is δ, and the achievable end-to-end transmission delay ($D'_\delta$) is determined by $IP(D'_i>D'_\delta)\leq\delta$.

14. An admission control unit for controlling an admission of connections to a shared wireless medium a connection being made up of one or several flows requiring a predetermined target application Protocol Data Unit (PDU) error rate ($\epsilon_i$) and at least an additional quality of service requirement ($D_i$; $T_i$), a data link layer being adapted for transmitting frames (LF; SF) of a predetermined maximum size (L; S), with an error rate (BER), the unit comprising:

means for applying criteria for new connections to determine whether resources can be provided for the establishment of a respective new connection,:

said means for applying criteria include:

means for calculating a number (R) of retransmissions of frames (LF; SF) which are needed in order to reach the target application PDU error rate ($\epsilon_i$) and the quality of service requirement ($D_i$; $T_i$), the number (R) of retransmissions depending on:

the target application PDU error rate ($\epsilon_i$);

a data link layer mean error rate (BER); and the maximum size (L; S) of the transmitted frames (LF; SF), means for calculating an achievable quality of service parameter ($D'_i$; $T'_i$) based on the calculated number (R) of retransmissions with the target application PDU error rate ($\epsilon_i$), and means for determining if resources can be provided to the connection depending on the achievable quality of service parameter ($D'_i$; $T'_i$).

* * * * *